US009039950B2

(12) United States Patent
Keite-Telgenbüscher et al.

(10) Patent No.: US 9,039,950 B2
(45) Date of Patent: May 26, 2015

(54) METHOD FOR THE PRODUCTION OF A LAYERED OR STACKED INORGANIC/ORGANIC COMPOSITE MATERIAL

(75) Inventors: Klaus Keite-Telgenbüscher, Hamburg (DE); Anja Staiger, Hamburg (DE); Uwe Michel, Comstock Park, MI (US)

(73) Assignee: tesa SE, Hamburg (DE)

( * ) Notice: Subject to any disclaimer, the term of this patent is extended or adjusted under 35 U.S.C. 154(b) by 622 days.

(21) Appl. No.: 12/741,662

(22) PCT Filed: May 5, 2008

(86) PCT No.: PCT/EP2008/055498
§ 371 (c)(1),
(2), (4) Date: Jul. 13, 2010

(87) PCT Pub. No.: WO2009/062762
PCT Pub. Date: May 22, 2009

(65) Prior Publication Data
US 2010/0279107 A1 Nov. 4, 2010

(30) Foreign Application Priority Data
Nov. 13, 2007 (DE) .......................... 10 2007 054 437

(51) Int. Cl.
| B32B 27/06 | (2006.01) |
| B32B 37/24 | (2006.01) |
| B29C 47/06 | (2006.01) |
| C03B 17/02 | (2006.01) |
| B32B 17/06 | (2006.01) |

(52) U.S. Cl.
CPC ................ *C03B 17/02* (2013.01); *B29C 47/06* (2013.01); *B32B 17/067* (2013.01); *B32B 27/06* (2013.01)

(58) Field of Classification Search
None
See application file for complete search history.

(56) References Cited

U.S. PATENT DOCUMENTS

| 3,732,181 | A | | 5/1973 | Ray et al. | |
| 4,314,031 | A | * | 2/1982 | Sanford et al. | 501/44 |
| 4,685,950 | A | * | 8/1987 | Schulze | 65/106 |
| 5,013,360 | A | | 5/1991 | Finkelstein et al. | |
| 5,043,369 | A | * | 8/1991 | Bahn et al. | 523/466 |
| 5,122,484 | A | | 6/1992 | Beall et al. | |
| 5,281,560 | A | | 1/1994 | Francis et al. | |
| 5,328,874 | A | | 7/1994 | Beall et al. | |
| 5,534,469 | A | | 7/1996 | Hayashi | |
| 6,268,425 | B1 | * | 7/2001 | Frayer et al. | 524/494 |
| 6,815,070 | B1 | * | 11/2004 | Burkle et al. | 428/425.6 |
| 7,001,858 | B2 | * | 2/2006 | Nakagawa et al. | 501/35 |
| 7,108,816 | B2 | * | 9/2006 | Wimberger-Friedl et al. | 264/173.11 |
| 7,148,165 | B2 | | 12/2006 | Masuda | |
| 2005/0202236 | A1 | * | 9/2005 | Busch et al. | 428/328 |
| 2006/0020075 | A1 | * | 1/2006 | Basham et al. | 524/494 |
| 2006/0021385 | A1 | | 2/2006 | Cimo et al. | |
| 2006/0052230 | A1 | | 3/2006 | Masuda | |
| 2006/0127588 | A1 | | 6/2006 | Muller et al. | |
| 2006/0187452 | A1 | * | 8/2006 | Wang | 356/364 |

FOREIGN PATENT DOCUMENTS

| DE | 765307 C | | 8/1954 |
| DE | 1955853 | | 11/1969 |
| DE | 3127721 A1 | | 2/1983 |
| DE | 102004057382 A1 | | 6/2006 |
| EP | 0365236 A1 | | 4/1990 |
| EP | 1248816 A1 | | 10/2002 |
| EP | 1272554 A1 | | 1/2003 |
| GB | 1319846 | * | 6/1973 |
| JP | 67022388 | * | 11/1967 |
| WO | 00/36665 A1 | | 6/2000 |
| WO | 00/41978 A1 | | 7/2000 |
| WO | 03/094256 A2 | | 11/2003 |
| WO | 2004/089620 A2 | | 10/2004 |
| WO | 2005/110741 A1 | | 11/2005 |
| WO | WO2005/110741 | * | 11/2005 |

OTHER PUBLICATIONS

International Search Report Dated Oct. 20, 2008.
German Search Report dated Nov. 10, 2008.
Extrusion Dies for Plastics and Rubber—Michaeli—Chapter 5-6 Coextrusion Process—Hanser Verlag 2003—Parts 1-6.
InnoRegion Suedthueringen—Verbundprojekt etc BMBF 0312902B—D Raab et al.
Tick, P.A., "Water Durable Glasses With Ultra Low Melting Temperatures", Physics and Chemistry of Glasses, Dec. 1984, pp. 149-154, vol. 25 No. 6, Research and Development Division Corning Glass Works, Corning, New York.

* cited by examiner

*Primary Examiner* — Jeffrey Wollschlager
(74) *Attorney, Agent, or Firm* — Norris McLaughlin & Marcus, P.A.

(57) ABSTRACT

The invention relates to a method for the production of a layered or stacked inorganic/organic composite material, a predominantly inorganic material being provided and a polymer material being provided, characterized in that the predominantly inorganic material has a glass transition temperature or melting temperature lower than 500° C., that the predominantly inorganic material and the polymer material are each molten, and that the predominantly inorganic material and the polymer material are coextruded from the melt and thus form the composite material.

20 Claims, No Drawings

METHOD FOR THE PRODUCTION OF A LAYERED OR STACKED INORGANIC/ORGANIC COMPOSITE MATERIAL

This application is a 371 application of PCT/EP2008/055498 filed May 5, 2008, which claims priority to the German application DE 10 2007 054 437.7 filed Nov. 13, 2007.

The present invention relates to a process for the production of a layer-type or layered inorganic/organic composite material with features disclosed hereinafter, to an alternative process with features disclosed hereinafter, and also to a composite material with features disclosed hereinafter.

Many different types of products are highly sensitive to gases and liquids, examples being foods, electronic products, medical devices and pharmaceutical products. Contact of products of this type with gases and liquids often leads over a certain period to ageing and finally to failure of the products. Electronic products in particular are very susceptible to moisture damage, since moisture can lead to reduced conductivity and to corrosion. This sensitivity is present to an even greater extent in the organic electronics sector than in inorganic electronics. There are therefore particular requirements for encapsulating appropriate products and devices for protection from gases and liquids. Oxygen transmission rate OTR and water vapour transmission rate WVTR are used to measure the effectiveness of this encapsulation. These rates give the flow rate of oxygen and respectively water vapour through a film under specific conditions of temperature and relative humidity. The lower these values, the greater the suitability of the respective material for encapsulation.

In recent years, high-specification plastics films have been developed as substrate materials for the production of displays and as replacement for thin glass substrates. Structures using plastics films can also give increased flexibility. Production of all of these films requires complicated specialized processes and the films are therefore relatively costly. It has moreover been found that the water- and vapour-permeability of these substrate films cannot be sufficiently reduced. A consequence of this is that there are limits to the quality and lifetime of electronic products based on these substrate films. Oxygen diffusing through the film leads to oxidation, in particular in the case of organic semiconductors, and oxidation of the electrodes composed of oxidizable metals, thus reducing lifetime.

It is known from the prior art that thin glass layers (layer thickness about 30-50 µm) can be used to achieve high barrier values, i.e. a low WVTR and a low OTR. In order to give the glass layers sufficient processability, these are laminated to a polymer film or coated with a polymer. This type of inorganic/organic composite material and processes for its production are disclosed in WO 00/41978 A1. Production of this type of glass-polymer composite material demands a large number of manufacturing steps. In these, the glass is first produced and, after cooling, brought into contact with the polymer. The cooled glass itself can be handled only with difficulty, and there is a high risk of irreversible damage to the glass, in particular if it is very thin.

It is moreover known from the prior art that multilayer structures can be produced from inorganic and organic layers on a backing film. The inorganic layers here are generally deposited in a vacuum. Examples of multilayer structures composed of inorganic and organic layers are revealed by WO 00/36665 A1, WO 2004/089620 A2 and WO 03/094256 A2.

However, the use of polymer films for the production of an inorganic/organic composite material is problematic, since these generally have surface defects and therefore likewise induce defects in the very thin vacuum-deposited inorganic layers. To eliminate these, films of this type have to be provided additionally with a polishing layer. The capital expenditure for the vacuum technology required is also very high and has to be repeated for in-line manufacture of multilayer structures if the intention is to avoid multiple passes through a plant. A further problem with the processing of very thin polymer films is handling these in a lamination process and laminating them without distortion.

Another process known from the prior art is the shaping in the melt of compounded polymer materials with inorganic materials, in particular with metals or their alloys, or else with low-melting-point glass. Both the organic and the inorganic materials in compounded materials of this type are in the molten state during the compounding process. The inorganic phase here is discontinuous, and compounded materials of this type cannot therefore provide substantial barriers to permeation. Examples of compounded materials of this type are revealed in U.S. Pat. No. 3,732,181, U.S. Pat. No. 5,043,369, EP 1 248 816 B1, EP 1 272 554 B1 and EP 0 365 236 B1.

U.S. Pat. No. 3,732,181 also reveals sheet-like composite materials. Small areas of these are produced by laminating glass foils and polymer films together under a press.

The problem underlying the present invention is to provide a simplified process for the production of a versatile inorganic/organic composite material.

The problem indicated above is solved in a process with the features disclosed hereinafter. A process disclosed hereinafter provides an alternative solution. A further solution is also provided in the form of a composite material. Advantageous embodiments are additionally provided hereinafter.

The invention begins by recognizing that it is possible to extrude a predominantly inorganic material to give a coherent sheet-like structure and in this process to achieve a low layer thickness of the sheet-like structure. A first surprising factor for the person skilled in the art is that the stability of the melt of the inorganic material is adequate for extrusion of this type of thin film, which can be combined with an organic material, in particular with a polymeric material.

Surprisingly, it is moreover possible to combine a predominantly inorganic melt over a large area with an organic material, in particular with a polymer material, without causing, for example, any thermal or geometric damage to the polymer material and/or to the sheet-like melt. In particular, it is also possible to omit adherent intermediate layers in this type of process for the production of a composite material.

The inorganic material here takes the form of a continuous phase, or is melted to give this. The scope of the invention therefore excludes the extrusion or coating of pastes, e.g. ceramic pastes, with a small proportion of binder, or powder slurries, since in these the inorganic phase is not continuous, and these materials are generally melted or sintered only after the extrusion process or coating process.

A predominantly inorganic material here means an inorganic material whose proportion of organic material is at most 20% by volume, preferably less than 10%, particularly preferably less than 1%. The smaller the proportion of organic material in the inorganic material, the better the barrier values that can be achieved, i.e. particularly low WVTR and OTR.

Extrusion means any of the continuous processes which form sheets or which form bodies and in which a molten or liquid material is conveyed by means of pressure through a die, within which a defined geometric shape is formed, generally a sheet or a profile (e.g. a pipe), and the material undergoes solidification via physical and/or chemical processes after discharge from the die.

In the first process of the invention, for the production of an inorganic/organic composite material, a predominantly inorganic material and a polymeric material are therefore provided. The predominantly inorganic material here has a melting point below about 500° C.

The glass transition temperature, also termed transformation point, can be measured inter alia with the aid of dynamic mechanical analysis (DMA) or dynamic differential calorimetry (DSC). The findings from DMA comprise a marked change in the tensile and shear modulus, and also a pronounced maximum of the change in damping, within a narrow temperature range. DSC measurements involve recording of heat capacity ($c_p$) as a function of temperature. Heat capacity exhibits a sudden change at the glass transition point. The melting point can be defined via the softening point. In the field of glass fusion, this is often stated as the temperature at which the dynamic viscosity is $10^{7.6}$ dPas (decipascal seconds=poise). It is also usual to state the Littleton softening point to ASTM C338-93 (2003).

The two materials are melted separately from one another and then coextruded from the melt. The manner of coextrusion is such as in particular to form the composite material as a sheet-like structure. Coextrusion has the advantage here over simple extrusion that the temperatures at which the two materials are bonded to one another are similar. This permits formation of a better bond between the inorganic material and the polymeric material. As the polymer film forms it moreover protects and stabilizes the layer of the inorganic material even before this has left the extrusion apparatus.

Any of the known processes can in principle be used for the coextrusion process, for example those described in Walter Michaeli: Extrusion Dies for Plastics and Rubber, Munich, Hanser Verlag 2003. However, the coextrusion process preferably takes place via a coextrusion die (multi-manifold die), since this has better suitability than, for example, a coextrusion adapter for melts which have different viscosities and temperatures. However coextrusion by means of a coextrusion adapter can also be used for the production of the composite material.

In a preferred embodiment of the process of the invention, the inorganic material is included between two layers of a polymeric material. This inclusion can take place within the context of the coextrusion process, but another possibility is that the inorganic material is extruded onto a polymeric backing and is then coated with a further polymeric layer. This type of coating can be carried out by means of processes known from the prior art. However, the coating process should in particular take place during the period when the temperature of the predominantly inorganic material is still above the melting point or glass transition temperature. Embedding of the inorganic material between two layers of a polymeric material is particularly advantageous, since there is then symmetrical distribution of any internal stresses arising after cooling, with resultant avoidance of, or at least reduction of, deflection of the sheet-like structure.

The coextrusion or coating process can be used not only for a two- or three-layer structure but also for any desired layer sequences with any desired number of organic and inorganic layers. In particular, it is also possible to extrude a plurality of layers of inorganic material together or in sequence.

If the inorganic material is included between two layers of a polymeric material, it is also possible that these two layers are produced from different polymeric material. It is therefore possible to adapt the two sides of the composite material individually to the respective use. By way of example, it is possible that one layer comprises materials with particularly high scratch resistance whereas the other layer has been specifically adapted to improve optical properties.

In a second process of the invention, the predominantly inorganic material is extruded directly onto a backing. The backing here can take the form of temporary backing (auxiliary backing) which is in turn removed after further steps of the process. However, the backing can also be a permanent backing and form the composite material with the inorganic material. In particular, the backing is a backing composed of polymeric material.

Again, in this process an inorganic material with a melting point or glass transition temperature below about 500° C. is used, in order to avoid impairment of the organic material by excessive temperatures. Another advantage of the relatively low temperature is that bonding of inorganic and organic material is possible even with large differences of coefficients of thermal expansion.

Here again, extrusion of the inorganic material onto the backing can apply the inorganic material as a full-surface layer with substantially uniform layer thickness, onto the backing. If the backing is a permanent backing forming a part of the composite material, a further advantage is directly obtained in that the predominantly inorganic material is directly extruded from the melt onto the backing. Because this takes place directly after the extrusion process, the temperature of the material is still elevated, permitting particularly good bonding between the backing and the inorganic material, without any need for provision of an additional layer, e.g. an adhesive layer.

If the backing onto which the layer of the inorganic material is extruded serves merely as auxiliary backing, a polymeric material is applied as organic material to that side of the inorganic material that is opposite to the auxiliary backing. The application of the polymeric material can take place via lamination to apply a polymer film, via coating with the polymeric material from the melt, or else via coating with the polymeric material from a solution or dispersion. Reference is made here in particular to the processes known from the prior art for formation of a polymeric layer, in particular of a polymeric film.

Coating processes are also derived from the extrusion process. For the purposes of the invention, these also include extrusion coating, in which the extruded material is applied, while it is still liquid, to a backing material running past the die, and it is also often exposed to an orientation process here, for example in order that the thickness of the material is reduced and/or rendered more uniform. These processes also include what is known as slotted-knife coating. Whereas in extrusion coating the thickness of the material is defined via the thickness of the die aperture, the melt flow rate and the take-off speed, in slotted-knife coating the thickness is substantially set via the distance between the die and the backing material.

The further advantages and embodiments described hereinafter are even if this is not explicitly mentioned on every occasion, particularly advantageous in relation to both production processes, i.e. coextrusion and simple extrusion of the inorganic material onto a backing.

The polymeric material should be applied to the predominantly inorganic material during the period when its temperature is above the melting point or glass transition temperature. Compliance with this threshold temperature can produce a composite material with particularly high adhesion.

A particular process-technology advantage is obtained with regard to the extrusion of the inorganic material onto a backing, which may be an auxiliary backing, if the extrusion die or the extrusion adapter is moved as close as possible to the backing. In particular, the distance between extrusion die or extrusion adapter and backing should not be more than 10 cm. The use of a minimum distance can specifically moreover avoid excessive and uncontrolled cooling of the inorganic material prior to contact with the backing.

The process of the invention moreover permits production of the composite material with minimum thickness. In particular, thicknesses below about 200 µm, preferably indeed below about 100 µm, can be produced. Even with this level of thickness, the predominantly inorganic material can nevertheless achieve a low WVTR and a low OTR.

In a more preferred variant, the thickness of the inorganic layer is below 25 µm, particularly preferably below 10 µm, very particularly preferably below 5 µm. This permits particularly high flexibility of the composite material.

The processes of the invention for the production of a composite material moreover provide the possibility of orienting the predominantly inorganic material after the extrusion process but prior to deposition on the backing, or of orienting of the entire composite material after the extrusion process. This can give a further reduction in the layer thickness of the composite material. The orientation can moreover render the layer thickness more uniform. The orientation can moreover establish particular optical properties.

The orientation here can take place in the longitudinal direction with respect to the extrusion direction or alternatively or additionally transversely with respect to the extrusion direction. The orientation is usually carried out at least in the ratio 1:2, preferably in the ratio 1:5.

The processes advantageously carried out downstream of the extrusion process, for example the abovementioned orientation process, also include shaping processes, e.g. blown-film production, blow moulding or thermoforming. These processes can give the extrudate a three-dimensional shape.

In a preferred embodiment, heat-conditioning of the composite material is moreover carried out after the production of the composite material, in particular therefore after the extrusion process, and at a temperature between about 30° C. and the glass transition temperature or the melting point of the inorganic layered material. Internal stresses frozen within the material can be reduced by means of this heat-conditioning.

The inorganic material is preferably a glass. "Low-melting-point" glasses can in particular be used for the invention, i.e. glasses whose glass transition temperature (transformation temperature) $T_G$ is low, in particular therefore whose $T_G$ is below 500° C.

An advantage of glass in this process, alongside its good processability, is that it is transparent. In conjunction with a transparent polymeric material, therefore, it is possible to produce a transparent composite material which complies with the high barrier values. A particularly suitable glass is lead glass, phosphate glass or borate glass. Glasses of this type are described by way of example in DE 765307 A, U.S. Pat. No. 5,013,360, U.S. Pat. No. 5,328,874, U.S. Pat. No. 5,534,469, U.S. Pat. No. 7,148,165 B2, U.S. Pat. No. 5,281,560 and U.S. Pat. No. 5,122,484, the disclosure of which with respect to the glasses used, in particular their constitution, is explicitly incorporated herein.

Glasses very particularly preferred are those in which phosphate or borate has been at least to some extent replaced by sulphate and/or in which network modifiers are used and/or in which the mixed alkali effect is utilized. The mixed alkali effect involves the replacement of, for example, $Na_2O$ to some extent by $Li_2O$ or $K_2O$, and like the other measures lowers the glass transition temperature. Glasses from the system $SnO/P_2O_5$ or $ZnO/P_2O_5$ can preferably be used, having particularly low melting points.

Preference is also given to the use of what are known as "short" glasses, i.e. glasses which have a narrow melting range and in which the decline in viscosity above the melting range is comparatively marked. By virtue of this property, the viscosities achieved are generally low enough even at relatively low temperatures (about 50° C. above the glass transition temperature) to permit extrusion, in particular in a coextrusion process. This softening point is generally determined to ASTM C338-93 (2003) (Littleton softening point).

Since low-melting-point glasses are often sensitive to the action of external media, it is further preferable to use corrosion-resistant glasses. High water resistance is particularly advantageous. These glasses with low glass transition temperature are disclosed, for example, in P. A. Tick: Water durable glasses with ultra low melting temperatures, Physics and Chemistry of Glasses 25(1984) p. 149.

Lead-free glasses are preferably used, for reasons of health and safety at work. Examples of these are disclosed in EP 1 248 816 B1.

In one preferred embodiment, at least one additive is added to the inorganic material and improves flow or lowers viscosity during the extrusion process. The additive can be added to the inorganic material here prior to or during the melting process. An example of a suitable additive is polyalkylene carbonate, obtainable as QPAC from Empower Materials, Newark, Del., USA.

The polymeric material used is preferably a high-temperature-resistant thermoplastic. This type of thermoplastic permits easy processing. This type of thermoplastic is moreover extremely inert, and there is therefore no need to consider any chemical reactions of the thermoplastic.

The polymeric material used moreover preferably comprises a transparent material. A composite material with high transparency can thus be produced, in particular in combination with a transparent glass. The transparency should in particular be provided in the visible spectral region (wavelength from about 400 nm to about 800 nm). For this, the transmittance of the composite material should be at least 70%, preferably at least 80%, more preferably at least 85%. In order to achieve this transparency, the individual materials used should also have appropriate transmittances.

The transparency of the polymeric material can be intrinsic to the material itself, as is the case for example in amorphous polymers, or can be generated via specific processing of the polymer, for example as is known to be obtainable via the high level of orientation of oriented polypropylene, which becomes transparent through orientation of the crystallites. Another example of transparency generated by way of the processing parameters is sudden cooling of the melt, thus preventing growth of crystallites, or of all but very small crystallites.

It is moreover preferable to use an organic material whose coefficient of thermal expansion in the temperature range from 20° C. to 200° C. is below $25 \times 10^{-6} K^{-1}$. The low thermal expansion is particularly advantageous for minimizing stresses between the inorganic material, in particular glass, and the polymeric material. In the case of a transparent polymer, for example, the low thermal expansion can be achieved via use of inorganic nano-particles as filler for a polymer, thus retaining optical transparency. This choice reduces the difference in thermal expansion with respect to the glass, thus giving a lower level of internal stresses in the composite material.

The thermal expansion of the inorganic material is moreover preferably above $12 \times 10^{-6} K^{-1}$ in the temperature range from 20° C. to 300° C. This choice reduces the difference in thermal expansion with respect to the polymer, the result being a lower level of internal stresses in the composite material. These glasses whose glass transition temperature is below 500° C. are described by way of example in Raab, D. et al: Inno Regio for southern Thuringia—Composite project: Entwicklung einer Schmelzkerntechnologie [Development of a fusible-core technique], sub-project 2: Lösliche Gießkerne aus Glas [Use of glass for sacrificial casting cores]: final report, subvention code BMBF 0312902B, the disclosure of which is incorporated herein by way of reference.

It is further preferable that the polymeric material used comprises an elastomeric or elastomer-modified polymer. This can provide elastic compensation of any internal stresses present in the polymeric material. To this end, an example of a suitable constituent of the polymeric material is silicones.

Further preference is given to an embodiment in which the polymeric material used comprises an adhesive mass. For this, any of the extrudable or coatable adhesive masses known to the person skilled in the art can be used. Among these are hot-melt adhesive masses, e.g. based on polyolefin (co)polymers or on polyamides, and reactive adhesive masses, e.g. based on epoxides or on acrylates, and pressure-sensitive adhesive masses, e.g. based on acrylates, or on synthetic rubbers (in particular on block copolymers) or on silicones. Viscous or visco-elastic adhesive masses are particularly advantageous, since they can provide compensation for stresses in the material, via flow processes. The same applies to viscous polymers, e.g. polyisobutylene or ethylene-vinyl acetate copolymers whose vinyl acetate content is more than 40%, these having markedly viscous properties, although they are not generally termed adhesive masses.

In a preferred embodiment, a multilayer composite material is produced in which at least on one layer of inorganic material a layer of an adhesive as polymeric material is applied, and at least one polymeric backing material is in turn applied to this layer. Here again, the production process can use coextrusion of all of the at least three layers or can use subsequent coating. The further polymeric backing material increases the stability of the composite material.

In another preferred embodiment, a multilayer composite material is produced in which at least on one layer of inorganic material a layer of a polymeric material is applied and at least one layer of an adhesive is applied to this layer. Here again, the production process can use coextrusion of all of the at least three layers or can use subsequent coating. This composite structure has the advantage that it can be adhesive-bonded to a substrate without any additional further steps.

In a further preferred embodiment of the processes, the composite material is stamped or, in particular by means of a laser, or water jet, is cut, after the production process. Very surprisingly, it has been found that the stamping and laser cutting of the composite material is possible without impairing the composite, for example through cracks in the glass. This can therefore give a simple method, in a further step of the process, of preparing the composite material for further processing.

The resultant composite material can be used advantageously in a wide variety of applications demanding a transparent or non-transparent permeation barrier.

In the electronic sector, applications that may be mentioned as particularly advantageous are solar cells, especially thin-layer solar cells, e.g. those based on silicon or on copper-indium-selenium or on their derivatives, and also dye solar cells and solar cells based on organic electronics, e.g. of hetero-conjugated polymers or of other polymeric semiconductors (such as small molecules and other compounds known to the person skilled in the art).

This type of composite material can also be advantageously used in the sector of organic light-emitting diodes, e.g. for display and illumination applications.

In the sector of display applications, the material can also be advantageously used for at least single-side encapsulation of electrophoretic (e-paper, electrowetting displays) or of electrochromic display apparatuses or displays.

Another advantageous application is found in the sector of electro-luminescent structures, since the pigments (phosphors) used are very sensitive to moisture and it is therefore advantageously possible to encapsulate the entire structure with the inventive layered material, this being considerably less expensive than the method currently used: encapsulation of each individual pigment particle.

Further advantageous applications are found in the sector of packaging of sensitive products. Here, the material according to the invention provides protection not only from emissions from the packaging (e.g. loss of moisture, of $CO_2$ or of flavour) but also from immission into the packaging (e.g. foreign flavours or oxygen).

Particularly advantageous applications are found in the sector of food packaging. Because the product is simple to produce, costs are low, and because it can readily be shaped by use of heat, it is possible to produce a wide variety of packaging geometries, including three-dimensional geometries, which can be produced by way of example via thermoforming or blow moulding. Thermoformed cups or blow-moulded bottles are examples that may be mentioned here.

Other particularly advantageous applications are found in the sector of packaging of pharmaceutical products. The advantages are similar to those in the food sector. Examples that may be mentioned here are blister packs, vials for medicaments, containers for infusion liquids, ampoules or single-use syringes containing medicaments.

There are further advantageous applications in the sector of glazing or panelling. According to the invention, therefore, polymeric panelling is provided with a scratch-resistant protective layer. Alternatively, the process can also be used to produce laminated glass, in which the polymer layer is generally thinner than the glass layer. Applications of these types of panelling are particularly found in vehicle construction, aircraft construction and shipbuilding.

EXAMPLE 1

A phosphate glass with the following constitution (in mol %) was purchased from Friedrich Farbglashütte GmbH, Kaufbeuren:
4.9% $Li_2O$; 9.4% $Na_2O$; 7.1% $K_2O$; 1.6% CaO; 36.6% ZnO; 20% $P_2O_5$ and 20.4% $SO_3$.

The grain size of the phosphate glass was below 1.5 mm. The glass transition temperature of the glass was 270° C. The glass was melted in a ram extruder at a temperature of 350° C. and conveyed into a slot coextrusion die.

The polymer used comprised an Apec 2000 polycarbonate from Bayer Material Science. It was in pellet form. The polymer was melted in a single-screw extruder at a maximum temperature of 350° C. and likewise conveyed into the coextrusion die.

In the coextrusion die, the glass melt stream was coated on both sides in each case with a stream of polymer melt. The volume throughput of each of the three streams of material was the same. The combined streams were finally discharged from the coextrusion die and applied to a chill roll temperature-controlled to 200° C. The composite was longitudinally oriented in the ratio 1:5 during discharge. The die lip gap here was 0.8 mm.

This gave a uniform composite with layer thicknesses of in each case about 80 μm. The composite proved to be resistant to bending around a radius of 100 mm, and therefore featured an industrially useful degree of flexibility.

Permeation of oxygen and water vapour was determined by a method based on DIN 53380 by means of Mocon permeation-measurement equipment. Oxygen permeation was determined here at 23° C. and 50% relative humidity, and water vapour permeation at 37.8° C. and 90% relative humidity. The values measured were in each below the detection limit of the measurement equipment: $10^{-3}$ g/m²d or $10^{-3}$ cm³/m²d bar. The inventive process could therefore produce defect-free barrier materials.

The present invention provides not only the production process but also a composite material produced according to one of the production processes. The composite material therefore has at least one layer of a predominantly inorganic material, and also at least one layer of a polymeric material. At least the predominantly inorganic layer of the composite material has been extruded.

In relation to the further embodiments of the composite material, and also to the individual components, reference is particularly made to the description above of the process according to the invention.

Another feature of the composite material in a preferred embodiment is an OTR below $10^{-3}$ cm³/m²d bar and a WVTR below $10^{-3}$ g/m²d bar.

The invention claimed is:

1. A process for the production of a layered inorganic/organic composite material, said layered inorganic/organic composite material consisting of a predominantly inorganic material layer, selected from the group consisting of lead glass, phosphate glass and borate glass, and a polymeric layer, the process comprising providing a predominantly inorganic material and a polymeric material, wherein the melting point of the predominantly inorganic material is below 500° C., melting the predominantly inorganic material and the polymeric material, and coextruding the predominantly inorganic material and the polymeric material in order to form the composite material by an extrusion process, wherein the composite material, including both the inorganic material layer and the polymeric layer, is subjected to an orientation process during discharge of the extrusion process, and wherein the thickness of the inorganic material layer is between 5 to 25 μm.

2. The process according to claim 1, wherein the predominantly inorganic material and the polymeric material are coextruded via a coextrusion die or a coextrusion adapter.

3. The process according to claim 1, wherein the composite material is produced with a thickness below 200 μm.

4. The process according to claim 1, wherein the composite material is longitudinally oriented at least in the ratio 1:2 and the composite material is transversely oriented at least in the ratio 1:2.

5. The process according to claim 1, wherein the composite material is heat-conditioned after the extrusion process at a temperature between 30° C. and the softening point or the melting point of the inorganic material.

6. The process according to claim 1, wherein the predominantly inorganic material extruded comprises a glass with a narrow melting range such that the softening point is not more than 50° C. above the glass transition temperature.

7. The process according to claim 1, wherein an additive for flow improvement is added to the inorganic material prior to or during the melting process.

8. The process according to claim 1, wherein the predominantly inorganic material extruded comprises a transparent material with a transmittance of at least 70% in the visible spectral region.

9. The process according to claim 1, wherein the polymeric material comprises a thermoplastic.

10. The process according to claim 1, wherein the polymeric material comprises a transparent material with a transmittance of at least 70% in the visible spectral region.

11. The process according to claim 1, wherein the polymeric material comprises an initially non-transparent material.

12. The process according to claim 1, wherein the polymeric material comprises a polymeric material whose coefficient of thermal expansion in the temperature range from 20° C. to 200° C. is below $25 \cdot 10^{-6}$ K$^{-1}$.

13. The process according to claim 1, wherein the predominantly inorganic material extruded comprises a material having coefficient of thermal expansion in the temperature range from 20° C. to 300° C. above $12 \cdot 10^{-6}$ K$^{-1}$.

14. The process according to claim 1, wherein an additive for lowering the coefficient of thermal expansion is added to the polymeric material prior to or during the melting process.

15. The process according to claim 1, wherein the polymeric material comprises an elastomeric or elastomer-modified polymer.

16. The process according to claim 1, wherein the polymeric material comprises an adhesive.

17. The process according to claim 1, wherein the composite material is stamped or cut.

18. The process according to claim 1, wherein the coextrusion process takes place in a multi-manifold die.

19. A process for the production of a layered inorganic/organic composite material, said layered inorganic/organic composite material consisting of a predominantly inorganic material layer, selected from the group consisting of lead glass, phosphate glass and borate glass, and to polymeric layers, the process comprising providing a predominantly inorganic material and two polymeric materials, wherein the melting point of the predominantly inorganic material is below 500° C., melting the predominantly inorganic material and the polymeric material, and coextruding the predominantly inorganic material and the polymeric material in order to form the composite material by an extrusion process, wherein the composite material, including the inorganic material layer and the two polymeric layers, is subjected to an orientation process during discharge of the extrusion process, and wherein the thickness of the inorganic layer is between 5 to 25 μm.

20. The process according to claim 19, wherein the two polymeric layers are extruded from respectively different polymeric material.

* * * * *